United States Patent [19]

McIlwain

[11] 3,872,619

[45] Mar. 25, 1975

[54] RAT TRAP

[76] Inventor: Ivy McIlwain, 440 Lamont St. N.W., Washington, D.C. 20010

[22] Filed: Jan. 9, 1974

[21] Appl. No.: 431,841

[52] U.S. Cl. .................................. 43/60, 43/65
[51] Int. Cl. .................................. A01m 23/16
[58] Field of Search .......................... 43/60, 65

[56] References Cited
UNITED STATES PATENTS

| 233,811 | 10/1880 | Sledge | 43/65 |
| 504,526 | 9/1893 | Hemp | 43/65 X |
| 1,743,036 | 1/1930 | Jetton | 43/65 |
| 2,126,512 | 8/1938 | Stemen | 43/65 |

*Primary Examiner*—Louis G. Mancene
*Assistant Examiner*—Daniel J. Leach
*Attorney, Agent, or Firm*—Shoemaker and Mattare

[57] ABSTRACT

A rat trap for luring and capturing live rats and the like, comprising an outer housing normally fixedly embedded in the ground and having at least one opening through the side thereof near the surface of the ground, a removable container fitted within the outer housing and having at least one opening through the side thereof in registry with the opening in the outer housing, whereby rats and the like are enabled to enter the container through said openings, closures on said container and outer housing normally preventing removal of said container from said outer housing and preventing rats in the container from leaving the container, and said container being removable from said outer housing for disposal of rats and the like trapped therein, as desired.

15 Claims, 7 Drawing Figures

PATENTED MAR 25 1975　　　　　　　　3,872,619

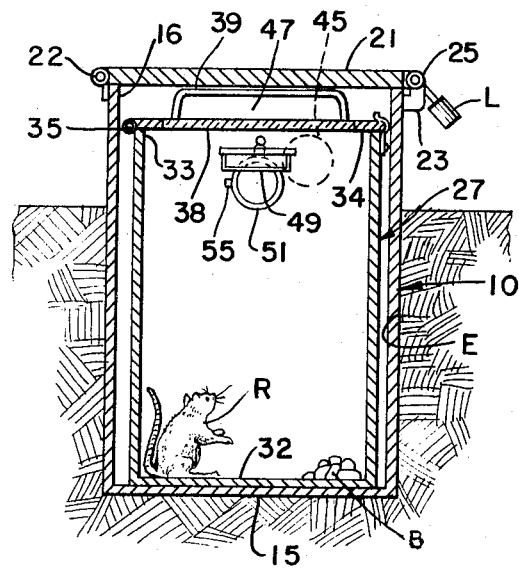
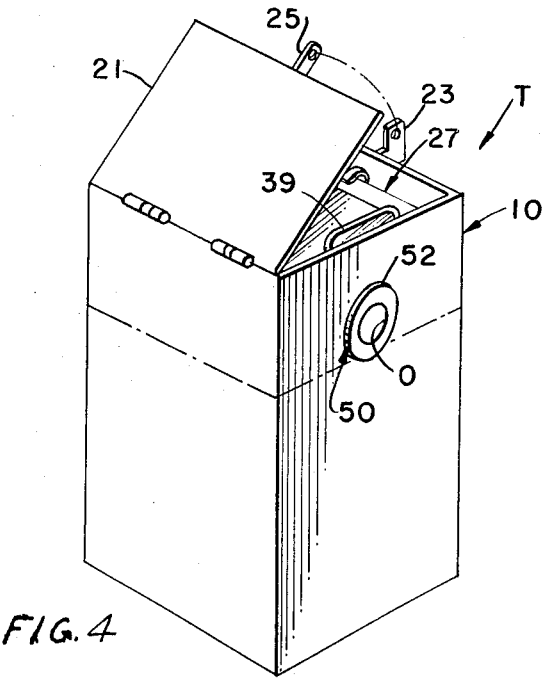
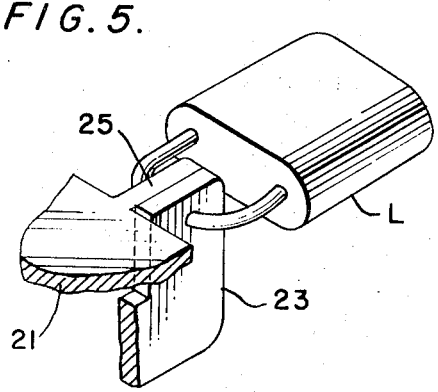
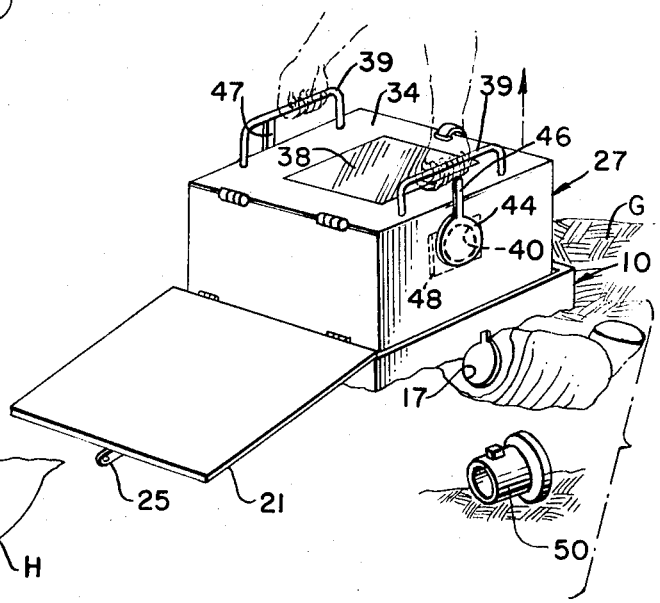
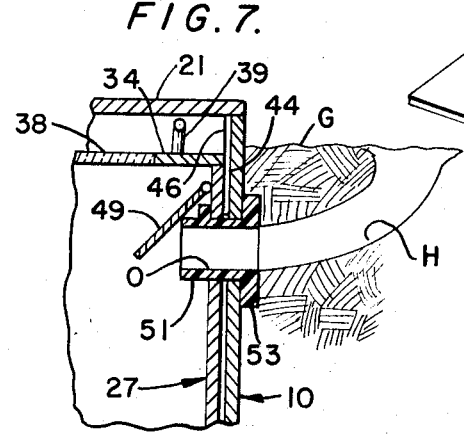

3,872,619

RAT TRAP

BACKGROUND OF THE INVENTION

The present invention relates to a unique trap for luring and trapping live rats and the like to free rat infested area of the rats and at the same time, to provide a means for transporting the trapped rats and the like to a research facility where the live rats may be used in research, or for destroying the rats, as desired.

Many communities are faced with a very serious problem in attempting to control or eliminate rat populations which, despite continuous attempts by man to destroy the rats, continue to thrive and grow thus presenting a serious health problem as well as presenting a danger of harm to children who may be bitten by the rats.

Many different types of traps and poisons and the like have been tried, but so far no means has been conceived for effectively controlling or eliminating rat populations in rat infested areas. For example, the traps known in the prior art are either too expensive to make them economically feasible or they are easily accessible to small children who may be injured by the trap, or in the event a rat is caught in a trap, a serious health problem is posed to children who may find the trap and a rat caught therein. Further, rats seem to possess the ability to quickly become immune to many types of poisons that are used to kill the rats and thus, not only are the poisons ineffective in controlling the rats, but the poisons present a serious threat to the well-being of other small animals and pets, and particularly to children. Still further, known methods of controlling or capturing rats render the rats unsuitable for research purposes, and accordingly, large sums of money must be spent in order to provide rats for research.

With the present invention, an economical and simple rat trap is provided which presents no danger to children and which presents absolutely no health hazard. With the present invention, rats and the like are preferably captured alive and subsequently disposed of either by utilizing them in research of by destroying them as desired, and thus, the problem of having dead rats lying about is eliminated. Moreover, with the present invention, and if it is desired, a poison or the like can be placed in the trap for killing rats therein, and since the poison is inaccessible to children and pets and the like, there is no danger of harm to other small animals or pets or children. Further, direct handling of the rats is not necessary with the present invention, and either dead rats killed by the poison, or live rats captured for research or other purposes, may simply be transported in the container for the desired disposition of the rats.

OBJECTS OF THE INVENTION

It is an object of this invention to provide a trap for capturing rats and the like, and wherein the trap presents no threat to children or other animals, and wherein the rats may be transferred to a facility for research or for destruction of the rats as desired without necessitating direct handling of the rats.

BRIEF DESCRIPTION OF THE DRAWINGS

FIG. 3 is a vertical sectional view on a reduced scale of a trap in accordance with the invention embedded in the ground and showing a rat trapped therein.

FIG. 4 is a perspective view of the trap according to the invention with the outer housing cover in an open position.

FIG. 5 is a greatly enlarged fragmentary perspective view of the lock means for the cover of the outer housing.

FIG. 6 is a perspective view of the container of the trap of the present invention being removed from the outer housing for transportation of rats trapped therein to a research facility or to a location where the rats may be destroyed as desired.

FIG. 7 is an enlarged, fragmentary, sectional view of a portion of the trap and the closure means for the opening therein.

DETAILED DESCRIPTION OF THE INVENTION

Figure 1:
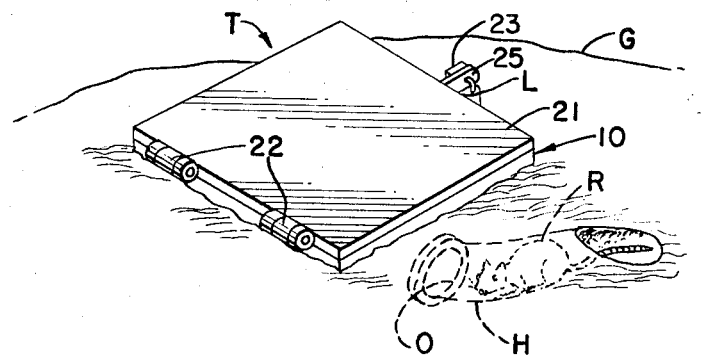
FIG. 1 is a perspective view of a trap in accordance with the invention embedded in the ground and showing a rat in phantom line approaching an opening in the trap.

In the drawings wherein like reference numerals indicate like parts throughout the several views, a trap T in accordance with the invention is shown embedded in the ground G in FIG. 1 with the upper end of the trap substantially flush with the surface of the ground. A rat R is seen in dotted lines digging its way through a tunnel or hole H to an opening O in the side of the trap T below the surface of the ground G, and whereat the rat is enabled to enter the trap T but is prevented from leaving the trap due to the distance from the bottom of the trap to the opening.

The trap comprises an outer housing 10 of substantially rectangular configuration and having opposite side walls 11, 12, 13 and 14, a bottom wall 15, and an open top 16. Opposite side walls 11 and 13 of the housing 10 have openings 17 and 18 therethrough adjacent the open upper end of the housing, and upwardly extending notches 19 and 20 are formed in the side walls 11 and 13 at the upper peripheral portions of openings 17 and 18. A substantially flat rectangular closure lid 21 is hingedly secured to the upper end of housing 10 in closing relationship to the open end 16 thereof by means of suitable hinges 22 on one side edge of the closure lid 21 and on the adjacent upper edge of side wall 12 of housing 10. An outwardly protruding ear 23 is suitably affixed on the outer surface of side wall 14 adjacent the upper edge thereof opposite the hinges 22 and has an opening 24 therethrough. An outwardly projecting tongue or ear 25 is also suitably secured to the edge of closure lid 21 opposite the hinges 22 thereon and has an opening 26 therethrough, and when the closure lid is in its closed position, the opening 24 through ear 23 is in registry with opening 26 through tongue or ear 25 for receiving a lock L such as a padlock or the like therethrough to secure the closure lid in its closed position.

A container 27 of substantially rectangular shape corresponding to the shape of housing 10 and including opposite side walls 28, 29, 30 and 31, a bottom wall 32, and an open upper end 33 and of slightly smaller dimensions than housing 10 is slidably positioned within the housing 10 with the upper end of container 27 spaced below the upper end of housing 10. A substantially flat rectangular closure lid 34 is hingedly secured over the open upper end of container 27 by means of hinges 35 at one side edge thereof and on an adjacent upper side edge of side 29 of the container. A suitable latch or lock means or the like 36 is engaged with the closure lid 34 opposite hinges 35 thereof to maintain the closure lid in its closed position. The closure lid 34 has a large rectangularly shaped opening 37 therethrough substantially in the center thereof, and the opening 37 is closed by means of a transparent cover 38 suitable secured in the opening 37. For example, the cover 38 could comprise a transparent plexiglass material or the like. Upstanding handle means 39 are secured to the closure lid 34 adjacent opposite edges thereof so that the handle means may be grasped to lift the container 27. Opposite side walls 28 and 30 of container 27 have openings 40 and 41 therethrough adjacent the upper ends thereof and in registry with the openings 17 and 18 in the housing 10 when the container is positioned within the housing with its bottom wall 32 supported on the bottom wall 15 of the housing. Upwardly extending notches 42 and 43 are formed in the side walls 28 and 30 at the upper peripheral portions of openings 40 and 41 therethrough, said notches being in registry with the notches 19 and 20 in the side walls of the housing 10 when the container is operatively positioned within the housing.

Figure 2:
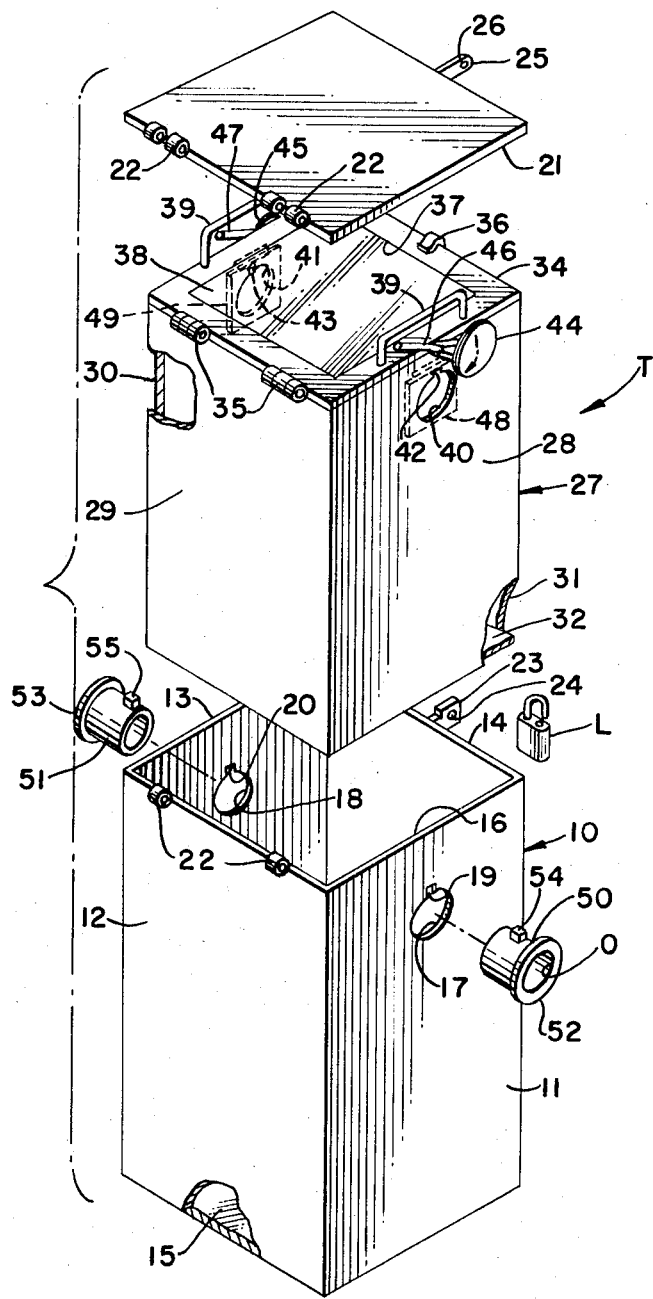
FIG. 2 is an exploded perspective view of the trap according to the present invention.

Substantially flat disc-shaped closure plates 44 and 45 are pivotally mounted to side walls 28 and 30 of the container 27 above the openings 40 and 41 therethrough, and the closure plates 44 and 45 have handle means 46 and 47 thereon whereby the closure plates 44 and 45 may be selectively manually pivoted into open and closed position over the openings 40 and 41, as desired. For example, when the container is positioned within the housing 10 and the closure lids 21 and 34 are closed with the trap positioned for capturing rats and the like, the closure plates 44 and 45 are positioned in uncovering relationship relative to openings 40 and 41 and engagement of the closure lid 21 of housing 10 with the handles 46 and 47 insures that the closure plates 44 and 45 will remain in their open positions so long as the parts are in their relationship as shown in FIG. 3, for example. Suitable flap type closures 48 and 49 are pivotally mounted to the inner surfaces of side walls 28 and 30 above the openings 40 and 41 therethrough and are normally in overlying closing relationship to the openings 40 and 41, as seen, for example in FIG. 2.

Suitable tubular inserts 50 and 51 having annular peripherally enlarged flanges or collars 52 and 53 on the outer ends thereof, and upstanding lugs or detents 54 and 55 thereon intermediate the ends thereof are inserted through the openings 17, 40 and 18, 41, with the upstanding lugs 54 and 55 passing through the notches 19, 42, and 20, 43, and with the inserts 50 and 51 then rotated through a suitable angle to place the lugs 54 and 55 thereon behind an adjacent portion of the respective walls 28 and 30 inwardly thereof to latch the inserts 50 and 51 against retraction through the openings until the inserts are turned to bring the lugs 54 and 55 thereon into registry with the notches. As seen in FIGS. 3 and 7, when the inserts are properly positioned through the side walls of the housing and container, the inner ends thereof engage the flap closures 48 and 49 and hold them in an open position.

In use, an excavation E is made in the ground G and the housing 10 is then positioned in the excavation with the top of the housing either substantially flush with the surface of the ground or spaced thereabove, as seen in FIG. 3 with the opening O above the surface of the ground. The container 27 is then placed within the housing 10 and the closure lids 34 and 21 are latched or locked in their respective closed positions. If desired, a suitable bait, such as food or the like B may be placed in the container 27 for attracting a rat R thereto. Also if desired, bait such as food or the like may be placed in the ground around or adjacent the opening O so that a rat is attracted to the vicinity of the opening where he can detect the bait within the container 27. The rat then enters the fittings 50 or 51 and climbs or jumps into the container to get at the bait therein. The rat is not able to exit through the inserts 50 and 51 due to their considerable height above the bottom 32 of the container, and also due to the fact that the walls of the container are smooth and thus afford no gripping surface to enable the rat to climb the walls. The container and housing are preferably made of metal so that the rat is not able to gnaw his way therethrough when he becomes trapped inside the container.

If desired, the housing 10 may be embedded or anchored with concrete placed in the excavation around the housing although the housing is equally as effective if it is merely embedded in the earth.

After a predetermined time, or as often as desired, a person may inspect the rat trap to determine if any rats have been caught therein. In order to do this the lock L is unlocked and the closure lid 21 of the housing 10 is opened, thus exposing to view the transparent cover plate 38 in the closure lid 34 of the container 27, whereby the person is enabled to look through the transparent cover plate into the container to observe any rats which may be present therein. If rats are observed within the container, the person then grasps the collars or flanges 52 and 53 on inserts 50 and 51, when the collars are positioned above ground as in FIG. 3, or digs the earth away to clear the collars for removal when they are disposed below ground, and turns them to bring the lugs 54 and 55 thereon into registry with the notches 19, 42 and 20, 43 at which time the inserts are withdrawn from the openings in the housing and container side walls. The handles 39 are then grasped and the container 27 lifted out of the housing 10. Removal of the inserts from the openings allows the closure flaps 48 and 49 to close over the openings 40 and 41, thus preventing the rats in the container from climbing out or jumping through the openings. As an additional precaution, the closure discs 44 and 45 are also pivoted into closing relationship over the openings 40 and 41 to insure that rats are not able to leave the container through the openings even in the event the container is tipped over, thus allowing the closure flaps 48 or 49 to swing open. The container with the rats therein is then carried to a suitable destination such as research facility where the rats may be removed from the container and utilized in research or where the rats may be destroyed, as desired.

If desired, suitable vent means such as vent holes or the like (not shown) may be provided in the container 27 to provide adequate ventilation to keep the rats confined therein alive.

A specific construction of rat trap according to the invention has a height of approximately 30 inches and a width of approximately 10 inches, and the container and housing are preferably made of steel to prevent the rats and the like from gnawing their way through the sides thereof. Also, rather than the lugs 54 and 55 and notches in the container and housing, other suitable means of removably securing the inserts 50 and 51 in the openings may be provided.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A rat trap for luring and capturing live rats and the like, comprising an outer housing having a top and bottom and normally fixedly embedded in the ground and having at least one opening through the side thereof near the surface of the ground, a removable container having a top and bottom and telescoped within the outer housing and having at least one opening through the side thereof in registry with the opening in the outer housing, whereby rats and the like are enabled to enter the container through said openings, said openings through the sides of the housing and container spaced upwardly from the bottom thereof a distance sufficient to prevent rats in the container from exiting through the opening, closures on said container and outer housing normally preventing removal of said container from said outer housing and preventing rats in the container from leaving the container, and said container being removable from said outer housing for disposal of rats and the like trapped therein, as desired.

2. A rat trap as in claim 1, wherein said outer housing and said container each have a closed bottom end and an open top end, said closures including lids pivotally secured to each of said housing and container over said open end thereof so that the closure on the container prevents escape of rats therefrom, and the closure on the housing prevents removal of the container from the housing when the lids are closed.

3. A rat trap as in claim 2, wherein the lid on the container includes a transparent portion for viewing the interior of the container when the lid on the housing is open and the lid on the container is closed.

4. A rat trap as in claim 2, wherein handle means are on the container for lifting and carrying the container.

5. A rat trap as in claim 2, wherein latch means are on the lid of the container to latch the container lid closed.

6. A rat trap as in claim 5, wherein lock means are on the lid of the housing to lock the housing lid closed.

7. A rat trap as in claim 2, wherein the housing and container are rectangular in shape, and the container is of a corresponding but smaller size than the housing so as to fit inside the housing.

8. A rat trap as in claim 7, wherein a tubular insert is in the opening in the side of the housing and container, said insert extending from outside the housing to inside the container.

9. A rat trap as in claim 8, wherein an opening and associated insert are in at least two side walls of the housing and container.

10. A rat trap as in claim 9, wherein a notch is formed in said side walls of the housing and container extending radially from the periphery of the openings therethrough, and a radially projecting lug is on each insert so that the lug may be aligned with the notch and the insert positioned through the opening in the housing and container, and the insert then turned to position the lug thereon behind a peripheral portion of the opening in the container to latch the insert against removal from the opening therethrough.

11. A rat trap as in claim 2, wherein said closures include at least one pivoted closure on the side of the trap to overlie and close the opening through the side thereof.

12. A rat trap as in claim 11, wherein said pivoted closure includes a closure on the outer surface of the housing to close the opening through the side thereof, and a closure on the inner surface of the container to close the opening through the container.

13. A rat trap as in claim 12, wherein the closure on the housing has a handle thereon to enable manual opening and closing of said closure relative to the opening through the housing, said handle engageable with a lid on an upper end of the housing to maintain the closure on the housing in open position when the lid on the housing is closed.

14. A rat trap as in claim 2, wherein the housing and container are made of metal to provide a smooth surface to thus prevent rats in the container from climbing the side of the container and to prevent rats from gnawing through the container and housing.

15. A rat trap as in claim 13, wherein the closure on the inner surface of the container is a flap type closure pivoted about an upper edge thereof, and a tubular insert extends through the openings in the side of the housing and container, an inner end portion of the insert engaging and maintaining the flap type closure open when the housing and container are operatively assembled together.

* * * * *